Oct. 9, 1951     C. L. VADNAIS     2,570,293
FISHING DEVICE
Filed May 3, 1947
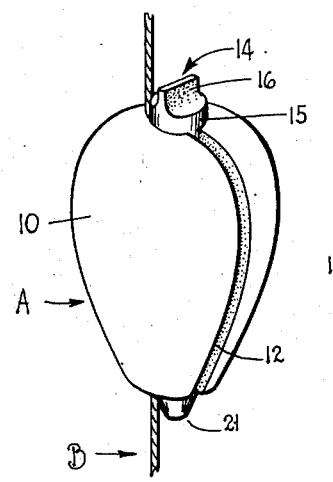
Fig~1
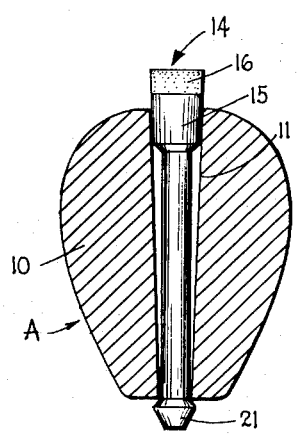
Fig~2
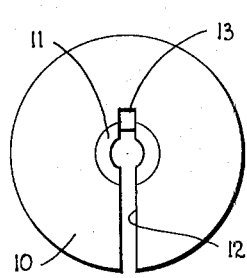
Fig~3
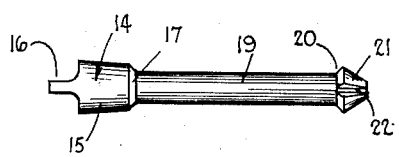
Fig~4
Fig~5
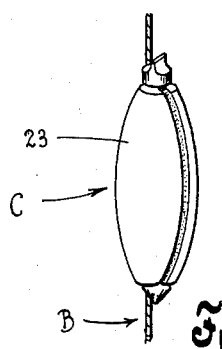
Fig~6
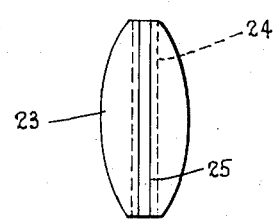
Fig~7
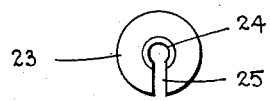
Fig~8
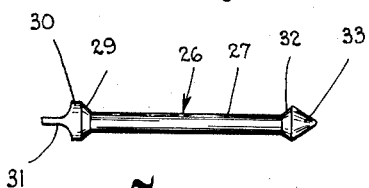
Fig~9
INVENTOR.
Charles L Vadnais
BY
Robert M. Dunning

Patented Oct. 9, 1951

2,570,293

UNITED STATES PATENT OFFICE 2,570,293

FISHING DEVICE

Charles L. Vadnais, St. Paul, Minn.

Application May 3, 1947, Serial No. 745,861

10 Claims. (Cl. 43—44.91)

My invention relates to an improvement in fishing device, wherein it is desired to provide a novel and effective means of holding a bobber or sinker upon a fish line.

Various means have been employed for attaching bobbers, sinkers and the like to fish lines. Many of these devices require that the line be twisted or knotted to hold the attachment in place. Other such devices pinch or squeeze the fish line to frictionally support the attachment in fixed position thereto. Not only are such devices somewhat difficult to attach, detach, and adjust in position, but they are also apt to have a deleterious effect upon the line itself.

An object of the present invention lies in the provision of a simple and effective means for clamping a bobber or sinker upon a line in such a manner that the line will not be injured by the attachment. My structure in preferred form embodies a resilient means which is engageable with the line to hold the attachment in fixed position. This resilient means urges the line against the body of the float or bobber but the engagement thus provided is resilient, thus preventing injury to the line clamped.

A feature of the present invention lies in the provision of a bobber or sinker having an aperture therethrough and having a slot in the body communicating with this aperture. An elongated clamping means extends through this body and is engageable therewith at opposite ends of the aperture. The resilience of the body tends to draw the ends of the body together, thereby clamping a fish line also extending through the aperture against the body of the bobber or sinker. By stretching or elongating this center elongated clamping means, the clamping action against the line may be relieved, allowing the line to be removed through the slot or allowing the position of the bobber or sinker to be changed relative to the line.

A feature of the present invention lies in the provision of a sinker or bobber including a clamping member normally urged into contracted form, but which may be elongated to release clamping pressure against the line. The position of the bobber or sinker on the line may be changed at any time by merely elongating the clamping means so that the line may move freely through the center aperture of the bobber or sinker.

An added feature of the present invention lies in the provision of a bobber and sinker comprising but two parts and which may be easily and quickly attached to a fish line at any desired point. As a result of this simple construction my float or bobber may be made at an extremely low cost and may be assembled at low cost. In assembling the bobber or sinker it is only necessary to elongate the stretchable clamping member, thus reducing the thickness of this member until it may slide through the slot communicating with the center aperture in the body of the sinker or bobber. No special jigs, dies, or fixtures are required for the assembly operation and the entire assembly can be completed in an extremely short time.

An added feature of the present invention lies in the provision of a bobber or sinker having an aperture therethrough and in the provision of a clamping means in the aperture comprising a body of resilient material. This body of resilient material increases in diameter as it contracts longitudinally. Thus by properly proportioning the body of the clamping member relative to the aperture in which it is located, the line may be clamped against the wall of the aperture by the expansion in diameter of the clamping means as it contracts in length.

These and other objects and novel features of my invention will be more clearly and fully set forth in the following specification and claims.

In the drawings forming a part of my specification:

Figure 1 is a perspective view of a float or bobber showing a line attached thereto.

Figure 2 is a sectional view through the float or bobber of Figure 1 showing the construction thereof.

Figure 3 is a top plan view of the float body, the clamping member having been removed therefrom.

Figure 4 is an elevation view of the resilient clamping means for holding the line in place.

Figure 5 is an end view of the clamping means shown in Figure 4.

Figure 6 is a perspective view of a sinker incorporating my invention.

Figure 7 is a side elevational veiw of the sinker showing the clamping means removed therefrom.

Figure 8 is an end view of the sinker shown in Figure 7.

Figure 9 is an elevation view of the clamping means used in conjunction with the sinker.

The bobber A illustrated in Figures 1 through 5 of the drawings includes a body 10 of light weight material such as wood, cork, or the like. This body 10 is of sufficient size to provide the necessary buoyancy to support the fish hook and line suspended therefrom. In preferred form the body is generally round in cross section and is of somewhat smaller diameter at its lower end than at its upper end. The body is also preferably rounded in profile, although the specific outer shape of the float body is not of particular importance in the present invention.

The float body 10 is provided with a tapered aperture 11 extending longitudinally therethrough. This tapered aperture is preferably somewhat larger at one end than at the other, being shown in the drawings as being of somewhat larger diameter at its upper extremity. A slot 12 extends through the body on a plane including the axis of the body 10, the slot 12 thus extending radially from the center of the bobber. The slot 12 is preferably provided with an extension 13 on the side of the aperture 11 opposite to the slot 12 for a purpose which will be later described in detail.

The clamping member 14 is preferably provided with a tapered end portion 15 which is slightly greater at its large diameter end than the large diameter end of the aperture 11. This clamping member 14 is preferably formed of rubber, synthetic rubber, or other resilient. The tapered portion 15 is shaped to enter the large diameter end of the aperture 11, but not to extend entirely thereinto. A flat web 16, cast integrally with the tapered portion 15 at the large diameter end thereof provides a grasping portion which may be held between the fingers for elongating the clamping member 14.

The small diameter end of the tapered plug 15 is connected by a tapered portion 17 to a relatively small diameter shank 19. This shank 19 must be of sufficiently small outer diameter to extend through the slot 12 when the member 14 is elongated. The end of the shank 19 is connected by an outwardly flaring portion 20 to the head portion 21, which is preferably of conical form. The head 21 is provided with an external diameter greater than the diameter of the aperture 11 at its small diameter end so that the head will not enter the small diameter end of the aperture 11.

A groove 22 is provided in the surface of this head end 21 through which the line B may extend when it is so desired.

The float A is assembled by merely grasping the ends of the clamping member 14 and elongating this member until the shank 19 is of sufficiently small diameter to pass through the slot 12. When once in place the ends of the clamping member are released, the tapered portion 15 of one end of the clamping member entering the large diameter end of the aperture 11 and the head 21 engaging against the float body at the small diameter end of the body.

When it is desired to attach the float A to a fish line, the fish line is inserted into the slot 12 to lie against the clamping member 14, and this clamping member is then stretched in length. As a result the line drops into the aperture 11. The ends of the clamping member may then be released. The resilience of the body of this member clamps the line against a wall of the aperture 11, thus holding the line firmly in place thereto.

In some instances it is desirable that the float be allowed to move within certain limits on the line. This may be accomplished by allowing the line to drop into the extension 13 of the slot 12. The head 21 is rotated so that the slot 22 therein is aligned with this slot portion 13. As a result the line may move freely through the body of the float. By applying stops to the line B at desired points the movement of the line through the float body may be regulated.

In elongating the member 14 it is possible to attach the float by first pulling on one end of the member 14 and then upon the other end. As a result the line B is allowed to first be engaged between the tapered portion 15 and the wall of the aperture 11 and then between the head 21 and the wall of the aperture or vice versa.

In Figures 6 through 9 of the drawings I disclose a sinker C, which embodies similar principles. As the main difference between a float or bobber and a sinker lies in the weight of the body of the device, either of these means may be held in place by my line locking means. While I show a slightly different form of construction in the sinker C than I have shown in the bobber A, it is obvious that by forming the body of the float 10 of heavy material the structures shown in Figures 1 through 5 may comprise a sinker. Similarly by employing a body of light weight material in place of the heavy material described in conjunction with Figures 6 through 9, this device may comprise a float or bobber in place of a sinker.

The sinker C includes a body 23 which may be of any suitable outside shape. The particular type of sinker illustrated includes an elongated body 23 which is of relatively small diameter at each end and of relatively larger diameter intermediate its ends. An aperture 24 extends axially through the body 23. A slot 25 is provided in one side of the body communicating with the aperture 24.

A clamping member 26 is provided within the aperture 24 to extend longitudinally thereof. The clamping member 26 includes a sinker shank 27 which is provided at one end with a flaring shoulder 29 connecting the shank to a generally cylindrical head 30. The head 30 is provided with a flat web 31 extending axially therefrom by means of which the head may be grasped.

The other end of the shank 27 is connected with an outwardly tapered or flaring portion 32 to a head end 33, this head end 33 being shown as generally conical in shape. If preferred both of the heads could be similarly constructed and both heads could be like either of the heads illustrated.

The shank 27 is of substantially the same external diameter as the aperture 24 or may be slightly larger than this aperture. As a result when the shank is in place it either snugly fits within the aperture 24 or is compressed slightly. However, by pulling longitudinally on the ends of the shank 27, the diameter of this shank may be reduced, thereby allowing a fish line to be clamped between the shank 27 and the wall of the aperture.

In the formation of my sinker C, it is only necessary to form the body 23 in the manner illustrated in Figures 7 and 8 and to form the clamping member 26 as illustrated in Figure 9. By stretching this clamping member 26 until the shank 27 is reduced in diameter, the shank may be slipped through the slot 25 and into the aperture 24. The ends of the shank are then released, allowing the shank to seal this aperture.

When it is desired to attach the sinker C to a line, the line is inserted into the slot 25 to rest upon the clamping member 26 and the ends of this clamping member are then pulled apart to reduce the diameter of the shank 27. The line B may then slide between the shank 27 and the wall of the sinker, being frictionally engaged therebetween.

In accordance with the patent statutes, I have described the principles of construction and operation of my fishing device, and while I have endeavored to set forth the best embodiments thereof, I desire to have it understood that these are only illustrative thereof and that obvious changes may be made within the scope of the following claims without departing from the spirit of my invention.

I claim:

1. A fish line attachment comprising a body having an aperture therethrough, a line clamping means engaged in said aperture, said line clamping means including a pair of ends engageable with said body at opposite ends of said aperture to clamp the line between at least one of said ends and said body, and resilient means extending longitudinally of said aperture connecting said ends to draw said ends together.

2. A fish line attachment including a body having an aperture therethrough, said body having a slot communicating with said aperture, and line clamping means in said aperture, said line clamping means including a pair of ends engageable with said body at opposite ends of said aperture to clamp the line between at least one of said ends and said body, and resilient connecting means in said aperture between said ends resiliently urging said ends together.

3. An attachment for a fish line including a body having an aperture therethrough, said body having a slot communicating with said aperture through which a fish line may be threaded into said aperture, and clamping means in said aperture, said clamping means including a pair of line clamping ends frictionally engageable with said body at opposite ends of said aperture to clamp the line between said ends and said body, and resilient means connecting said ends and urging said ends against said body.

4. An attachment for a fish line including a body having an aperture therethrough, said body having a slot communicating with said aperture through which a fish line may be threaded into said aperture, a clamping means in said aperture, said clamping means including a plug of resilient material extending longitudinally through the aperture, said plug being reduced in diameter when elongated and expandable in diameter when contracted.

5. An attachment for a fish line including a body having an aperture therethrough, a plug of resilient material in said aperture, means for holding said plug engaged in said aperture, said plug being expandable and contractable in cross section upon contraction or expansion longitudinally, said plug when expanded being operable to clamp a fish line extending through the aperture against the wall of the aperture.

6. An attachment for a fish line comprising a body having an aperture therethrough, and a plug of resilient material extending through said aperture, said plug being contractable or expandable in cross section upon elongation or contraction of said plug longitudinally, ends on said plug to hold said plug from disengagement with said aperture, said plug when expanded substantially filling said aperture throughout at least a portion of the length thereof.

7. An attachment for a fish line comprising a body having an aperture therethrough, a plug extending through said aperture, a pair of ends on said plug frictionally engageable against said body, and integral resilient connecting means connecting said ends to urge the same against said body.

8. An attachment for a fish line including a body, said body having a tapered aperture extending therethrough, a plug extending through said aperture, said plug including an end shaped to enter the large diameter end of said aperture, and a second end engageable against the body at the small diameter end of the aperture, and resilient connecting means connecting said ends to urge the same into engagement with said body.

9. An attachment for a fish line including a body having a tapered aperture therethrough, a resilient plug including a head engageable with said body adjacent the small diameter end of the aperture and a tapered portion engageable into the large diameter end of said aperture, and resilient means connecting said ends.

10. An attachment for a fish line comprising a body having an aperture therethrough, said body having a slot communicating with said aperture through which a fish line may be threaded into said aperture, said body having a groove adjacent said aperture into which said fish line may extend, and a plug in said aperture, said plug having ends thereupon designed to engage said body and resilient means connecting said ends, said ends substantially filling said aperture when engaged against said body.

CHARLES L. VADNAIS.

REFERENCES CITED

The following references are of record in the file of this patent:

UNITED STATES PATENTS

| Number | Name | Date |
|---|---|---|
| 522,167 | Rawlings | June 26, 1894 |
| 668,254 | Dickinson | Feb. 19, 1901 |
| 771,263 | McCord | Oct. 4, 1904 |
| 1,152,755 | Perron | Sept. 7, 1915 |
| 1,295,448 | Dingwell | Feb. 25, 1919 |
| 1,951,924 | Clark | Mar. 20, 1934 |
| 2,162,821 | Parmenter | June 20, 1939 |
| 2,237,412 | Carothers | Apr. 8, 1941 |